(12) United States Patent
Cho et al.

(10) Patent No.: US 12,381,945 B2
(45) Date of Patent: Aug. 5, 2025

(54) METHOD FOR MANAGING PERSISTENT GROUP INFORMATION OF ELECTRONIC DEVICE

(71) Applicant: Samsung Electronics Co., Ltd., Suwon-si (KR)

(72) Inventors: Namju Cho, Suwon-si (KR); Buseop Jung, Suwon-si (KR); Beomjip Kim, Suwon-si (KR); Hakkwan Kim, Suwon-si (KR); Hyejung Bang, Suwon-si (KR); Dooho Lee, Suwon-si (KR); Sunkee Lee, Suwon-si (KR); Soonho Lee, Suwon-si (KR); Wonjun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/450,760

(22) Filed: Aug. 16, 2023

(65) Prior Publication Data

US 2023/0396671 A1   Dec. 7, 2023

Related U.S. Application Data

(63) Continuation of application No. PCT/KR2022/000054, filed on Jan. 4, 2022.

(30) Foreign Application Priority Data

Feb. 17, 2021   (KR) .................. 10-2021-0021337

(51) Int. Cl.
H04L 67/104       (2022.01)
H04L 9/40         (2022.01)

(52) U.S. Cl.
CPC ........ H04L 67/1051 (2013.01); H04L 63/104 (2013.01)

(58) Field of Classification Search
CPC .............. H04L 67/1051; H04L 63/104; H04L 67/1044; H04L 65/40; H04W 4/08; H04W 76/14; H04W 84/20
(Continued)

(56) References Cited

U.S. PATENT DOCUMENTS 8,780,759 B2 * 7/2014 Kim ................. H04W 8/186
                                           370/254
9,888,438 B2    2/2018 Fang et al.
(Continued)

FOREIGN PATENT DOCUMENTS

KR    10-2006-0034607 A    4/2006
KR    10-2012-0066932 A    6/2012
(Continued)

OTHER PUBLICATIONS

International Search Report with Written Opinion and English translation dated Apr. 11, 2022; International Appln. No. PCT/KR2022/000054.

*Primary Examiner* — Wing F Chan
*Assistant Examiner* — John Fan
(74) *Attorney, Agent, or Firm* — Jefferson IP Law, LLP

(57) ABSTRACT

A method for managing persistent group information of an electronic device is provided. The electronic device is a group member of a persistent group. The method includes when the persistent group information is deleted in response to a specific event, the electronic device transmits, to the group members, a message requesting the deletion of the persistent group information stored by group members of the persistent group, thus making it possible to delete the persistent group information and enabling synchronization to proceed.

15 Claims, 8 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 2013/0227237 | A1* | 8/2013 | Tashiro | ................... G06F 3/067 |
| | | | | 711/170 |
| 2013/0339504 | A1* | 12/2013 | Montemurro | ......... H04W 48/20 |
| | | | | 709/223 |
| 2014/0003286 | A1 | 1/2014 | Estevez et al. | |
| 2015/0245393 | A1* | 8/2015 | Lee | ...................... H04W 72/51 |
| | | | | 370/338 |
| 2016/0173586 | A1 | 6/2016 | Mccann et al. | |
| 2016/0353368 | A1 | 12/2016 | Fang et al. | |
| 2017/0085638 | A1* | 3/2017 | Lee | ..................... H04L 67/1046 |
| 2019/0174574 | A1 | 6/2019 | Filgueiras et al. | |
| 2020/0404733 | A1* | 12/2020 | Hu | ........................ H04W 36/00 |
| 2021/0274587 | A1* | 9/2021 | Jung | ..................... H04W 76/30 |

FOREIGN PATENT DOCUMENTS

| | | |
|---|---|---|
| KR | 10-2015-0014215 A | 2/2015 |
| KR | 10-1501443 B1 | 3/2015 |
| KR | 10-2015-0138168 A | 12/2015 |
| KR | 10-2017-0060735 A | 6/2017 |
| KR | 10-2020-0067734 A | 6/2020 |
| WO | 2014/142415 A1 | 9/2014 |

\* cited by examiner

METHOD FOR MANAGING PERSISTENT GROUP INFORMATION OF ELECTRONIC DEVICE

CROSS-REFERENCE TO RELATED APPLICATION(S)

This application is a continuation application, claiming priority under § 365(c), of an International application No. PCT/KR2022/000054, filed on Jan. 4, 2022, which is based on and claims the benefit of a Korean patent application number filed on Feb. 17, 2021, in the Korean Intellectual Property Office, the disclosure of which is incorporated by reference herein in its entirety.

BACKGROUND

1. Field

The disclosure relates to a method for managing persistent group information of an electronic device.

2. Description of Related Art

When a group is formed by making a 1:1 connection between electronic devices in a peer to peer (P2P) method, one electronic device may serve as an owner of the group and the other electronic device may serve as a client of the group. Although various processes such as provisioning and negotiating are required for a P2P connection, when a persistent group is formed, the P2P connection may be possible without going through a separate pre-procedure required for the P2P connection.

When a persistent group is formed, an owner of a group and a client of a group belonging to the persistent group may both store persistent group information. An unnecessary P2P connection may not occur through persistent group information management.

The above information is presented as background information only to assist with an understanding of the disclosure. No determination has been made, and no assertion is made, as to whether any of the above might be applicable as prior art with regard to the disclosure.

SUMMARY

After forming a persistent group through a peer to peer (P2P) connection, an owner and a client of the persistent group both store persistent group information, and when the persistent group information is deleted in either one, a failure process of a P2P connection may be reduced by allowing other subjects belonging to the group to delete the persistent group information.

According to various embodiments disclosed herein, when persistent group information is deleted from either an owner or a client of a persistent group storing the persistent group information, all members of the persistent group may maintain the persistent group information in the same state as a group member whose persistent group information is deleted requests the deletion of the persistent group information to other group members who are storing the persistent group information.

Aspects of the disclosure are to address at least the above-mentioned problems and/or disadvantages and to provide at least the advantages described below. Accordingly, an aspect of the disclosure is to provide a method for managing persistent group information of an electronic device.

Additional aspects will be set forth in part in the description which follows and, in part, will be apparent from the description, or may be learned by practice of the presented embodiments.

In accordance with an aspect of the disclosure, a method for managing persistent group information of an electronic device is provided. The method includes receiving a peer to peer (P2P) connection provision request from an external electronic device, transmitting a P2P connection provision response in response to the P2P connection request, transmitting a group owner negotiation request to the external electronic device, receiving a group owner negotiation response from the external electronic device, storing persistent group information when a persistent group with the external electronic device is formed, transmitting a request for deletion of the persistent group information to the external electronic device when the persistent group information is deleted according to an event, and receiving, from the external electronic device, a response to deletion of the persistent group information when the persistent group information is deleted from the external electronic device.

In accordance with another aspect of the disclosure, a method for managing persistent group information of an electronic device is provided. The method includes receiving a peer to peer (P2P) connection provision request from an external electronic device, transmitting a P2P connection provision response in response to the P2P connection request, transmitting a group owner negotiation request to the external electronic device, receiving a group owner negotiation response from the external electronic device, storing persistent group information when a persistent group with the external electronic device is formed, receiving, from the external electronic device, a request for deletion of the persistent group information when the persistent group information is deleted from the external electronic device according to an event, deleting the persistent group information according to the request for deletion, and transmitting a response to deletion of the persistent group information to the external electronic device when the persistent group information is deleted.

According to various embodiments disclosed herein, when persistent group information is deleted from any one of group members of a persistent group, an unnecessary connection may be excluded during a P2P connection between the group members of the persistent group by making sure that the persistent group information is also deleted from other group members belonging to a group corresponding to the deleted persistent group information.

According to various embodiments disclosed herein, efficient management for a persistent group may be possible by synchronizing persistent group information between group members of the persistent group.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which the disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 1:
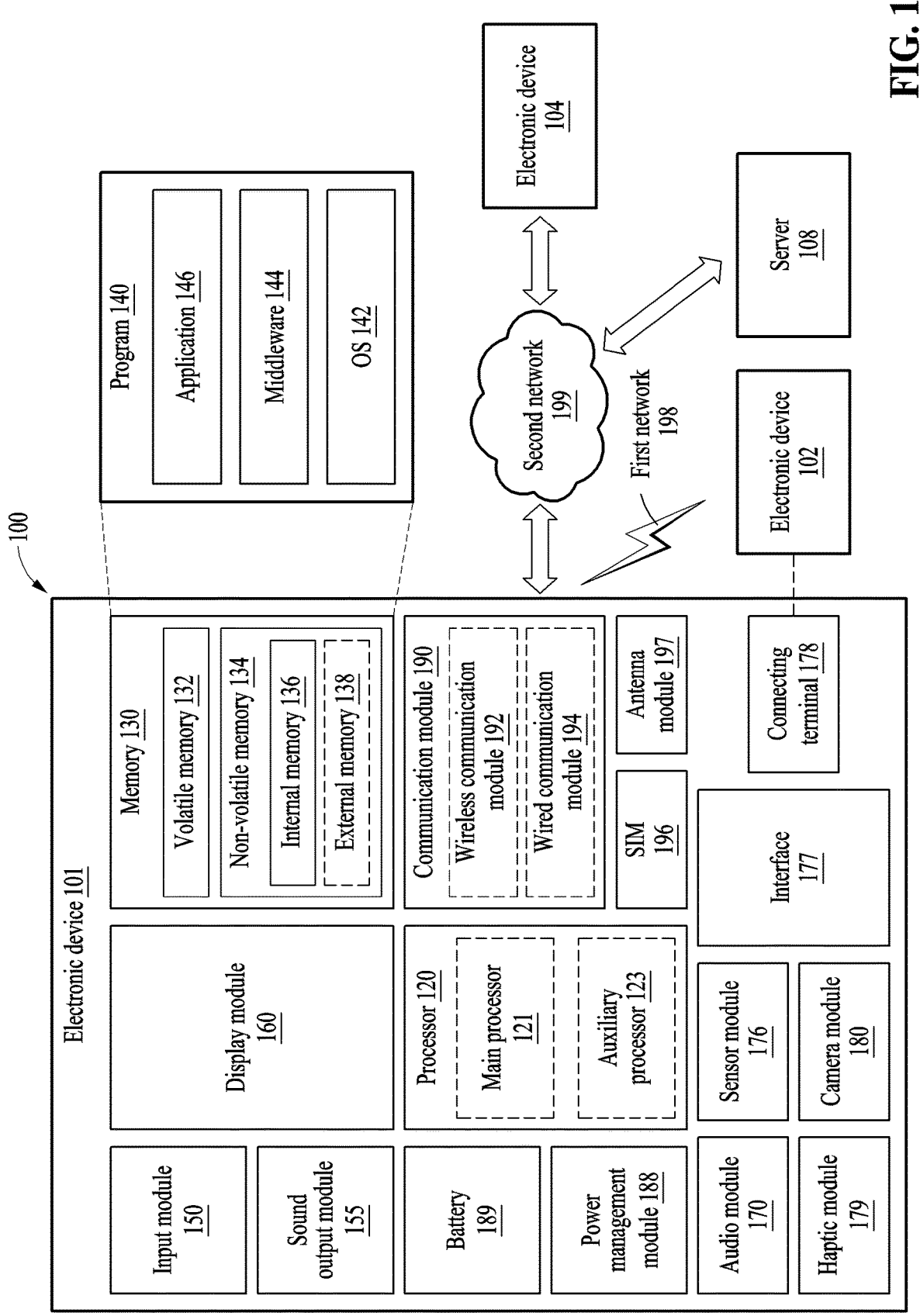
FIG. 1 is a diagram illustrating components of an electronic device applied to a network infrastructure according to an embodiment of the disclosure.

FIG. 1 is a diagram illustrating components of an electronic device applied to a network infrastructure according to an embodiment of the disclosure.

FIG. 1 is a block diagram illustrating an electronic device 101 in a network environment 100 according to various embodiments.

An electronic device may be an electronic device having a wireless communication function. The electronic device may be, for example, a smartphone, a tablet computer, a portable phone terminal, a laptop computer, and a wearable electronic device such as a smart watch, a portable game electronic device, a navigation device, a multimedia playback device, and a headset device.

The electronic device may support at least one type of wireless communication function. The wireless communication may be, for example, cellular network communication, wireless short distance network communication (e.g., Wi-Fi, etc.), wireless short distance network communication (e.g., Bluetooth, etc.), global positioning system (GPS), and near field communication (NFC).

The electronic device may include at least one antenna to support such a wireless communication function. The antenna may function for transmitting or receiving signals through wireless communication. One antenna may support one type of wireless communication or may support two or more wireless communications complexly.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to another embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to yet another embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to a further embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented as separate from, or as part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state, or together with the main processor 121 while the main processor 121 is in an active state (e.g., executing an application). According to still another embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., an NPU) may include a hardware structure specified for artificial intelligence model processing. An artificial intelligence model may be generated through machine learning. Such learning may be performed, for example, by the electronic device 101 in which an artificial intelligence model is executed, or via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The artificial intelligence model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to another embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to yet another embodiment, the display module 160 may include a touch sensor adapted to sense a touch, or a pressure sensor adapted to measure the intensity of force incurred by the touch.

The audio module 170 may convert a sound into an electrical signal and vice versa. According to a further embodiment, the audio module 170 may obtain the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to still another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to the external electronic device (e.g., the electronic device 102). According to another embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to yet another embodiment, the haptic module

179 may include, for example, a motor, a piezoelectric element, or an electric stimulator.

The camera module 180 may capture a still image and moving images. According to a further embodiment, the camera module 180 may include one or more lenses, image sensors, ISPs, or flashes.

The power management module 188 may manage power supplied to the electronic device 101. According to still another embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to yet another embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to a further embodiment, the antenna module 197 may include an antenna including a radiating element including a conductive material or a conductive pattern formed in or on a substrate (e.g., a printed circuit board (PCB)). According to still another embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as part of the antenna module 197.

According to another embodiment, the antenna module 197 may form a mmWave antenna module. According to yet another embodiment, the mmWave antenna module may include a PCB, an RFIC disposed on a first surface (e.g., the bottom surface) of the PCB or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to a further embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to still another embodiment, all or some of operations to be executed at the electronic device 101 may be executed at one or more of external electronic devices (e.g., the external electronic devices 102 and 104, or the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In an embodiment, the external electronic device 104 may include an Internet-of-things (IoT) device. The server 108 may be an intelligent server using machine learning and/or a neural network. According to another embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to the embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to yet another embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B or C", "at least one of A, B and C", and "at least one of A, B, or C", may include any one of, or all possible combinations of the items enumerated together in a corresponding one of the phrases. As used herein, such terms as "1$^{st}$" and "2$^{nd}$," or "first" and "second" may be used to simply distinguish a corresponding component from another, and does not limit the components in other aspect (e.g., importance or order). It is to be understood that if a component (e.g., a first component) is referred to, with or without the term "operatively" or "communicatively", as "coupled with", "coupled to", "connected with", or "connected to" another component (e.g., a second component), it means that the component may be coupled with the other component directly (e.g., by wire), wirelessly, or via a third component.

As used in connection with embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to a further embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Figure 2:
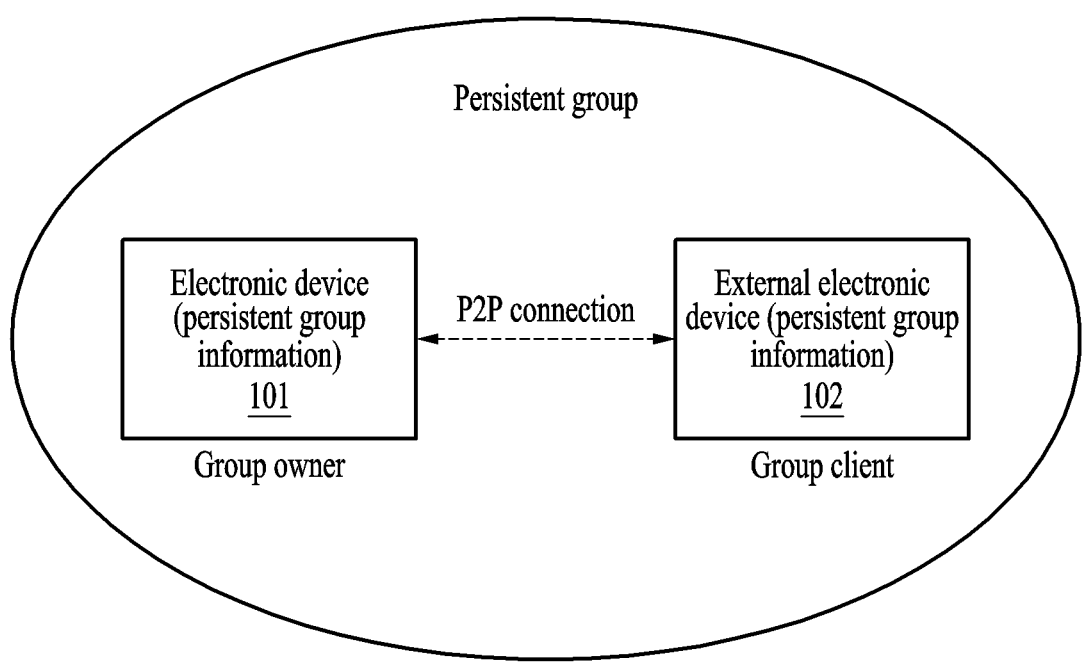
FIG. 2 is a diagram illustrating a peer to peer (P2P) connection process between group members of a persistent group according to an embodiment of the disclosure.

FIG. 2 is a diagram illustrating a peer to peer (P2P) connection process between group members of a persistent group according to an embodiment of the disclosure.

The electronic device 101 and the external electronic device 102 shown in FIG. 2 may include components of the electronic device 101 shown in FIG. 1. The electronic device 101 and the external electronic device 102 may perform a P2P connection. For example, the P2P connection may be made through a Wi-Fi Direct connection. The Wi-Fi Direct connection may refer to a direct connection between terminals of a Wi-Fi environment without going through an access point, which is an intermediate terminal.

Referring to FIG. 2, when the electronic device 101 and the external electronic device 102 perform a P2P connection, a group may be formed. In FIG. 2, the electronic device 101 may be a group owner and the external electronic device 102 may be a group client. The group owner and the group client may refer to respective roles of members of the group and may be determined through negotiation in a P2P connection process.

FIG. 2 illustrates a form in which one external electronic device 102 is connected to one electronic device 101, but a form in which N external electronic devices 102 are connected to one electronic device 101 may not be excluded herein. Depending on the capability of the electronic device 101, which is the group owner, the number of acceptable external electronic devices 102 may increase.

When the electronic device 101 and the external electronic device 102 form a group, the group may be set as one of a temporary group or a persistent group. The type of group may be determined during a group owner negotiation process in a P2P connection process. When a group formed through a P2P connection is determined to be a persistent group, group members of the persistent group may store an authentication type, an encryption type, a network key, and a service set identifier (SSID), which are credential information, and persistent group information including a group role (a group owner or a group client). The group members storing persistent group information may skip advance procedures of provision discovery, a group owner negotiation process, and provisioning during the next P2P connection, and the connection rate may be improved by immediately forming a persistent group based on the persistent group information.

The provision discovery may refer to a process of confirming the existence of a peer terminal to which a P2P connection is to be made through P2P discovery. The group owner negotiation process may refer to a process of determining which terminal plays either an owner or a client in a group formed through a P2P connection. The provisioning may refer to a process of exchanging credential information between the group owner and the group client. When group members of a persistent group perform a P2P connection, a P2P connection such as Wi-Fi Direct may be quickly performed using persistent group information without going through provision discovery, a group owner negotiation process, and provisioning.

The group owner of the persistent group may immediately generate a group by exchanging messages related to a procedure request and a procedure response including attributes of a previous group, and the group client may quickly form a persistent group by accessing the group through credential information.

Herein, when persistent group information is deleted from one of the group members of a persistent group, an error that may occur may be eliminated when a group member who stores the persistent group information performs a P2P connection by processing the persistent group information of all the remaining group members to be deleted. The group members of the persistent group may synchronize of the persistent group information so that the state of the persistent group information is the same. When the persistent group information is deleted from one of the group members of the persistent group, a group member whose persistent group information is deleted may request the deletion of the persistent group information stored by the other group members by notifying the other group members that the persistent group information is deleted.

Figure 3:
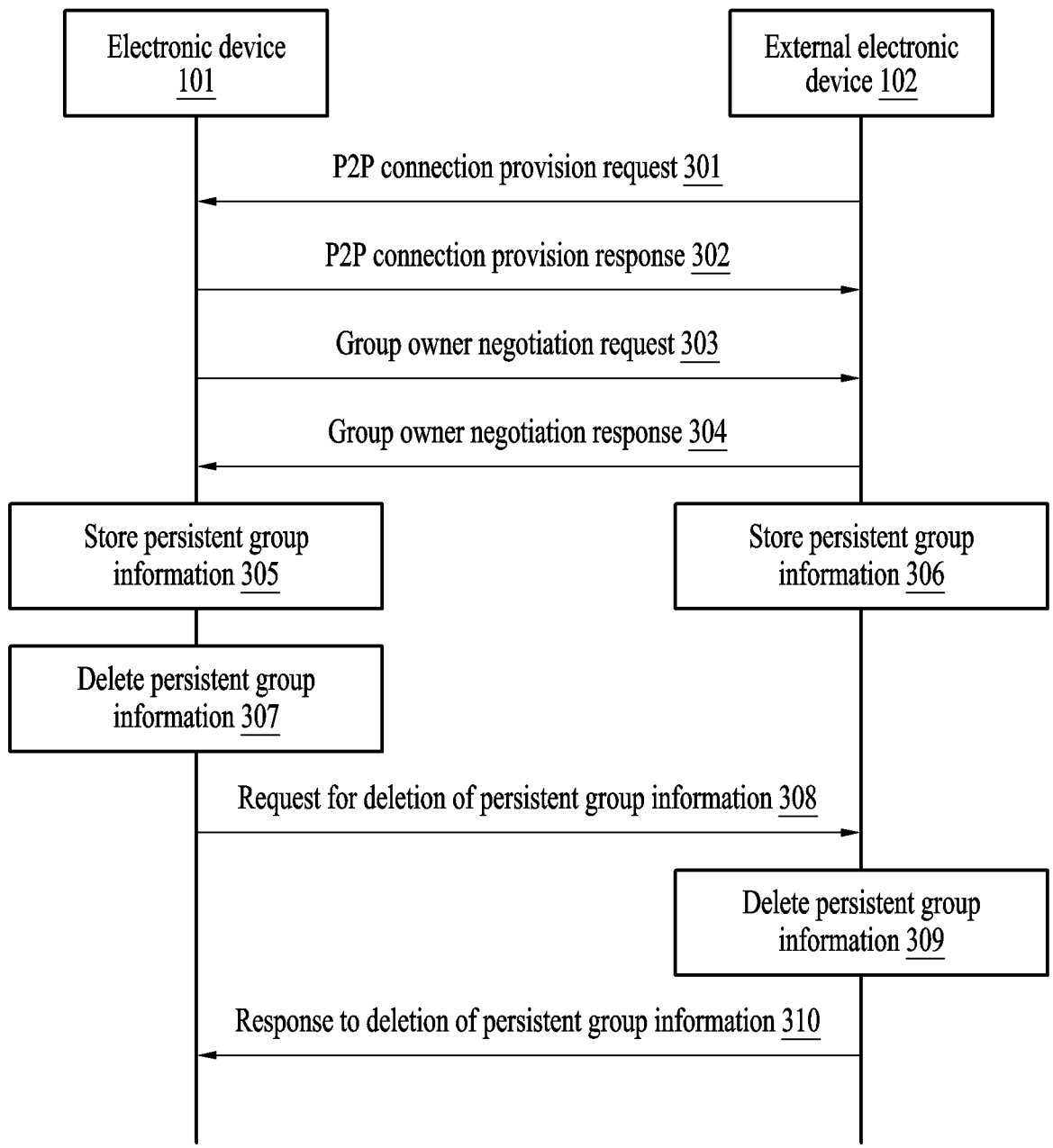
FIG. 3 is a flowchart illustrating a process of synchronizing persistent group information when persistent group information is deleted from an electronic device according to an embodiment of the disclosure.

FIG. 3 is a flowchart illustrating a process of synchronizing persistent group information when persistent group information is deleted from an electronic device according to an embodiment of the disclosure.

FIG. 3 may illustrate a case in which persistent group information is deleted from the electronic device 101 among the electronic device 101 (e.g., the electronic device 101 of FIG. 1 or FIG. 2) and an external electronic device (e.g., the external electronic device 102 of FIG. 2) forming a persistent group. The operations to be described with reference to FIG. 3 may not necessarily be performed in sequential order.

In operation 301, the electronic device 101 may receive a P2P connection provision request from the external electronic device 102.

In operation 302, the electronic device 101 may transmit a P2P connection provision response to the external electronic device 102.

In operation 303, the electronic device 101 may transmit a group owner negotiation request to the external electronic device 102.

In operation 304, the electronic device 101 may receive a group owner negotiation response from the external electronic device 102. Through operations 301 to 304, the electronic device 101 and the external electronic device 102 may form a persistent group. The electronic device 101 may operate as a group owner of the persistent group and the external electronic device 102 may operate as a group client of the persistent group.

When a persistent group is formed, in operation 305, the electronic device 101 may store persistent group information, and in operation 306, the external electronic device 102 may store persistent group information. The persistent group information may be stored in each file system of the electronic device 101 and the external electronic device 102.

Referring to FIG. 3, in operation 307, persistent group information may be deleted from the electronic device 101, which is a group owner. The persistent group information may be deleted by a user of the electronic device 101 or deleted according to any one event of initialization of network information, initialization of the entire electronic device 101, or an error in the file system of the electronic device 101.

In operation 308, the electronic device 101 may transmit a request for deletion of persistent group information to the external electronic device 102. In operation 309, the external electronic device 102 may delete the persistent group information stored in the file system according to the request for deletion of the persistent group information received from the electronic device 101. In operation 310, the electronic device 101 may receive a response to deletion of the persistent group information from the external electronic device 102 in response to the request for deletion of the persistent group information received from the external electronic device 102.

Referring to FIG. 3, when persistent group information is deleted from the electronic device 101, which is the group owner of the persistent group, the electronic device 101 may allow a nearby device to recognize that a group to which the electronic device 101 belongs is not a persistent group by changing a persistent P2P group bit included in the group capability to "0" and transmitting a beacon and a probe response to the nearby device.

A method for managing persistent group information of an electronic device (e.g., the electronic device 101 of FIG. 1 or FIG. 2) may include operation 301 of receiving a P2P connection provision request from an external electronic device (e.g., the external electronic device 102 of FIG. 2), operation 302 of transmitting a P2P connection provision response in response to the P2P connection request, operation 303 of transmitting a group owner negotiation request to the external electronic device, operation 304 of receiving a group owner negotiation response from the external electronic device, operation 305 of storing persistent group information when a persistent group with the external electronic device is formed, operation 308 of transmitting a request for deletion of the persistent group information to the external electronic device when the persistent group information is deleted according to an event in operation 307, and operation 310 of receiving, from the external electronic device, a response to deletion of the persistent group information, when the persistent group information is deleted from the external electronic device.

The request for deletion of persistent group information may be transmitted through the same communication method as that of a P2P connection forming a persistent group when the persistent group is maintained.

The request for deletion of persistent group information may be transmitted through a communication method that is different from a P2P connection forming a persistent group when the persistent group is released.

The external electronic device 102 may perform a P2P connection through provision discovery, a group owner negotiation process, and provisioning when performing the P2P connection with an electronic device after persistent group information is deleted.

The electronic device 101 may transmit information indicating that a group to which the electronic device 101 belongs is not a persistent group to a nearby device after persistent group information is deleted.

The persistent group information may include an authentication type, an encryption type, a network key, and an SSID, which are credential information, and a group role meaning a group owner or a group client.

Figure 4:
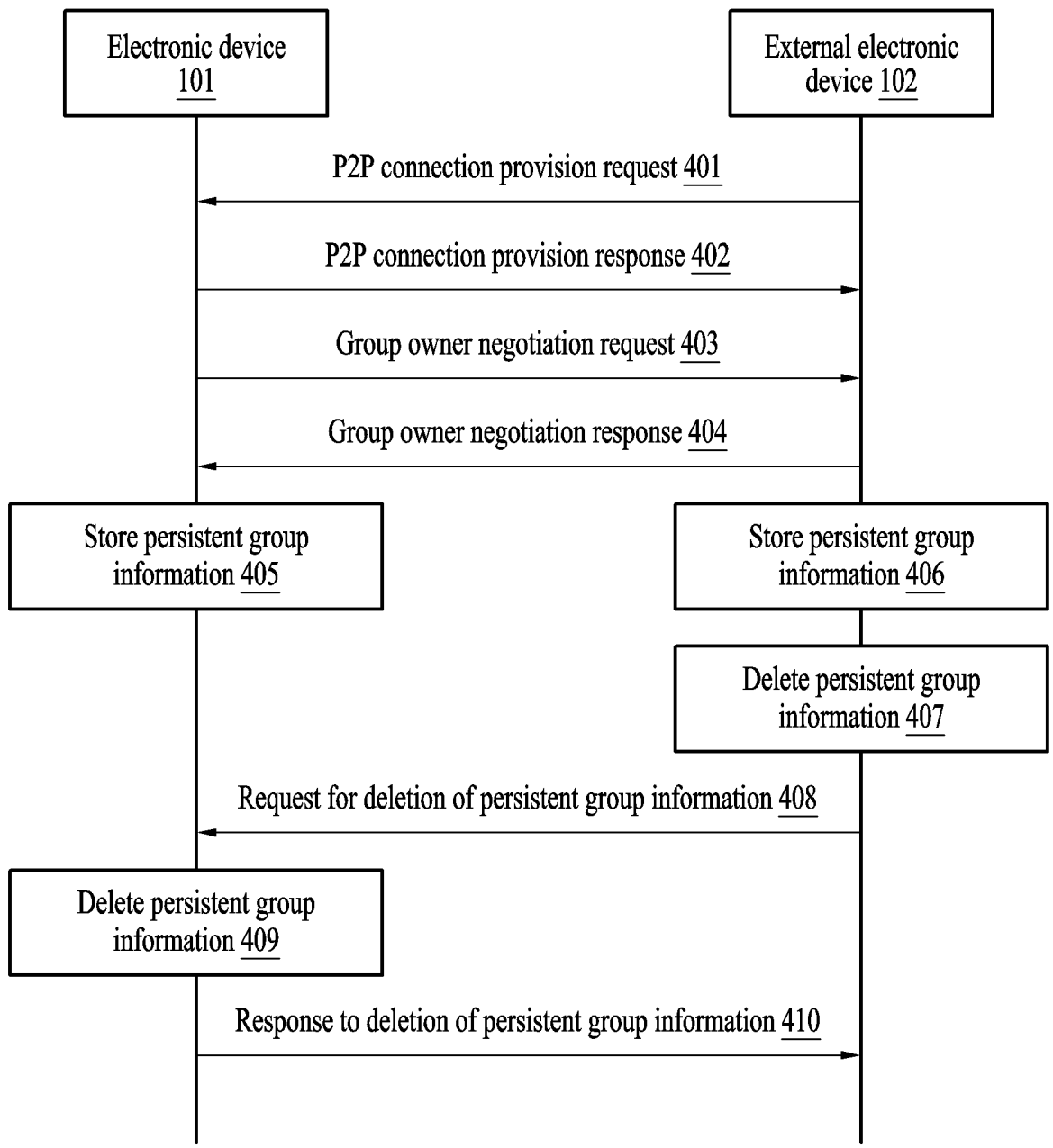
FIG. 4 is a flowchart illustrating a process of synchronizing persistent group information when persistent group information is deleted from an external electronic device according to an embodiment of the disclosure.

FIG. 4 is a flowchart illustrating a process of synchronizing persistent group information when persistent group information is deleted from an external electronic device according to an embodiment of the disclosure.

FIG. 4 may illustrate a case in which persistent group information is deleted from the external electronic device 102 among the electronic device 101 (e.g., the electronic device 101 of FIG. 1 or FIG. 2) and an external electronic device (e.g., the external electronic device 102 of FIG. 2) forming a persistent group. The operations to be described with reference to FIG. 4 may not necessarily be performed in sequential order.

In operation 401, the electronic device 101 may receive a P2P connection provision request from the external electronic device 102.

In operation 402, the electronic device 101 may transmit a P2P connection provision response to the external electronic device 102.

In operation 403, the electronic device 101 may transmit a group owner negotiation request to the external electronic device 102.

In operation 404, the electronic device 101 may receive a group owner negotiation response from the external electronic device 102. Through operations 401 to 404, the electronic device 101 and the external electronic device 102 may form a persistent group. The electronic device 101 may operate as a group owner of the persistent group and the external electronic device 102 may operate as a group client of the persistent group.

When a persistent group is formed, in operation 405, the electronic device 101 may store persistent group information, and in operation 406, the external electronic device 102 may store persistent group information. The persistent group information may be stored in each file system of the electronic device 101 and the external electronic device 102.

Referring to FIG. 4, in operation 407, persistent group information may be deleted from the external electronic device 102, which is a group client. The persistent group information may be deleted by a user of the external electronic device 102 or deleted according to any one event of initialization of network information, initialization of the entire external electronic device 102, or an error in the file system of the external electronic device 102.

In operation 408, the electronic device 101 may receive a request for deletion of persistent group information from the external electronic device 102. In operation 409, the electronic device 101 may delete the persistent group information stored in the file system according to the request for deletion of the persistent group information received from the external electronic device 102. In operation 410, the electronic device 101 may transmit a response to deletion of the persistent group information to the external electronic device 102 in response to the request for deletion of the persistent group information received from the external electronic device 102.

A method for managing persistent group information of an electronic device (e.g., the electronic device 101 of FIG. 1 or FIG. 2) according to an embodiment may include operation 401 of receiving a P2P connection provision request from an external electronic device (e.g., the external electronic device 102 of FIG. 2), operation 402 of transmitting a P2P connection provision response in response to the P2P connection request, operation 403 of transmitting a group owner negotiation request to the external electronic device 102, operation 404 of receiving a group owner negotiation response from the external electronic device 102, operation 405 of storing persistent group information when a persistent group with the external electronic device is formed, operation 406 of receiving, from the external electronic device 102, a request for deletion of the persistent group information when the persistent group information is deleted from the external electronic device 102 according to an event, operation 407 of deleting the persistent group information according to the request for deletion, and operation 408 of transmitting a response to deletion of the persistent group information to the external electronic device 102 when the persistent group information is deleted.

The request for deletion of persistent group information may be transmitted through the same communication method as that of a P2P connection forming a persistent group when the persistent group is maintained.

The request for deletion of persistent group information may be transmitted through a communication method that is different from a P2P connection forming a persistent group when the persistent group is released.

The external electronic device 102 may perform a P2P connection through provision discovery, a group owner negotiation process, and provisioning when performing the P2P connection with an electronic device after persistent group information is deleted.

The electronic device 101 may transmit information indicating that a group to which the electronic device 101 belongs is not a persistent group to a nearby device after persistent group information is deleted.

The persistent group information may include an authentication type, an encryption type, a network key, and an SSID, which are credential information, and a group role meaning a group owner or a group client.

Figure 5:
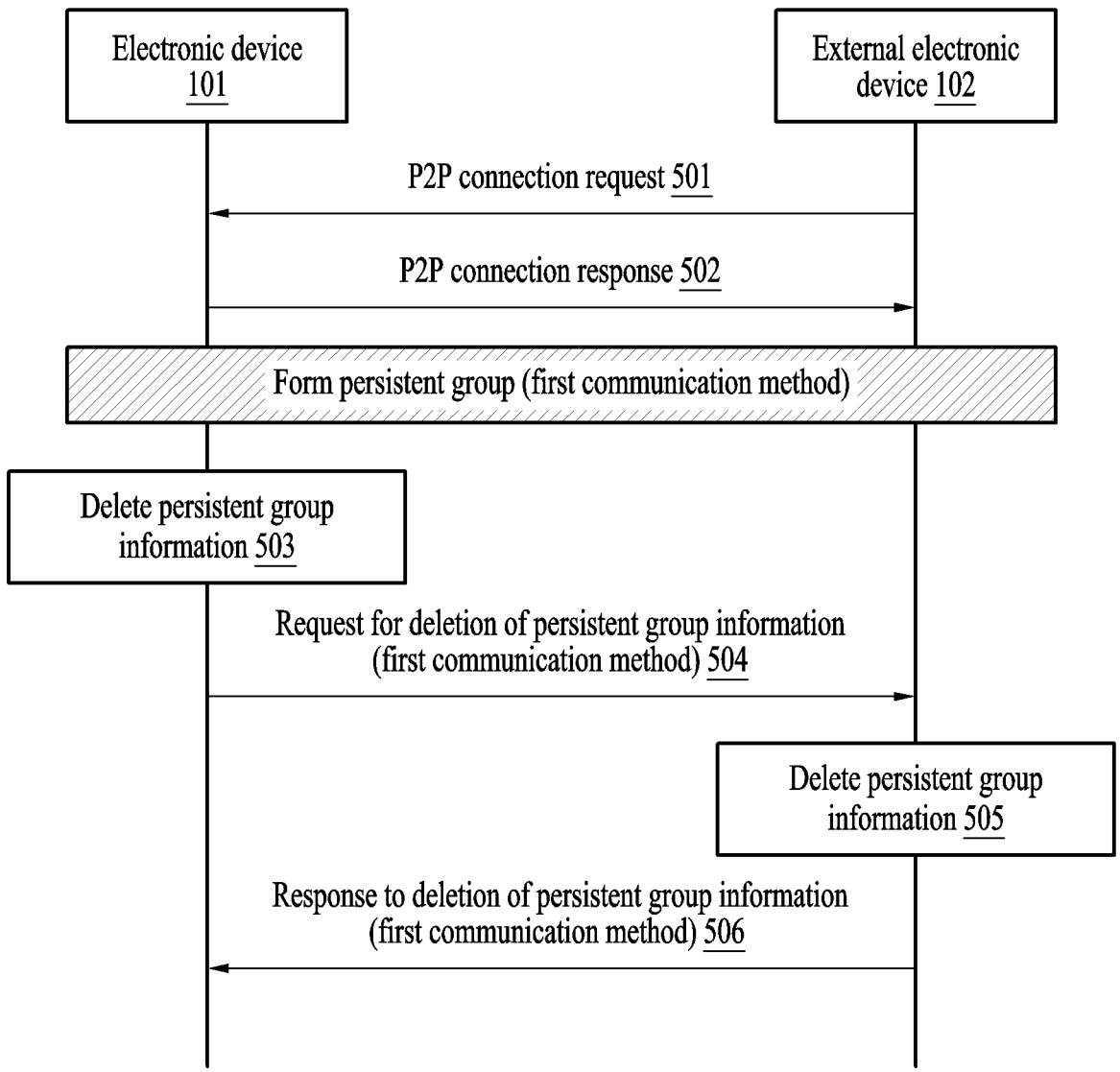
FIG. 5 is a flowchart illustrating a process of deleting persistent group information during formation of a persistent group according to an embodiment of the disclosure.

FIG. 5 is a flowchart illustrating a process of deleting persistent group information during formation of a persistent group according to an embodiment of the disclosure.

FIG. 5 may illustrate a case in which persistent group information is deleted from the electronic device 101 among the electronic device 101 (e.g., the electronic device 101 of FIG. 1 or FIG. 2) and an external electronic device (e.g., the external electronic device 102 of FIG. 2) forming a persistent group. The operations to be described with reference to FIG. 5 may not necessarily be performed in sequential order. FIG. 5 may assume a case in which a persistent group is already formed according to an advance procedure for a P2P connection, such as operations 301 to 304 shown in FIG. 3 or operations 401 to 404 shown in FIG. 4.

In operation 501, the electronic device 101 may receive a P2P connection request from the external electronic device 102. In operation 502, the electronic device 101 may transmit a P2P connection response to the external electronic device 102 in response to the P2P connection request. Through operations 501 and 502, a P2P connection may be made between the electronic device 101 and the external electronic device 102 and a persistent group may be formed. The data transmission may be possible between the electronic device 101 and the external electronic device 102 through a first communication method (e.g., a Wi-Fi Direct connection) in the persistent group.

In operation 503, the electronic device 101 may delete persistent group information according to a specific event. According to an embodiment, the persistent group information may be deleted by a user of the electronic device 101 or deleted according to any one event of initialization of network information, initialization of the entire electronic device 101, or an error of the file system of the electronic device 101.

In operation 504, the electronic device 101 may transmit a request for deletion of persistent group information to the external electronic device 102 storing the persistent group information. Since a P2P connection is made through a persistent group, the electronic device 101 may transmit the request for deletion of the persistent group information through the same first communication method as that of a P2P connection. For example, the electronic device 101 may transmit the request for deletion of the persistent group information to the external electronic device 102 using an action frame or a GAS frame through the P2P connection.

In operation 505, the external electronic device 102 may delete persistent group information from the file system according to the request for deletion of the persistent group information received from the electronic device 101.

In operation 506, the electronic device 101 may receive a response to deletion of persistent group information from the external electronic device 102. For example, since a P2P connection is made through a persistent group, the electronic device 101 may receive the response to deletion of the persistent group information through the same first communication method as that of a P2P connection.

Figure 6:
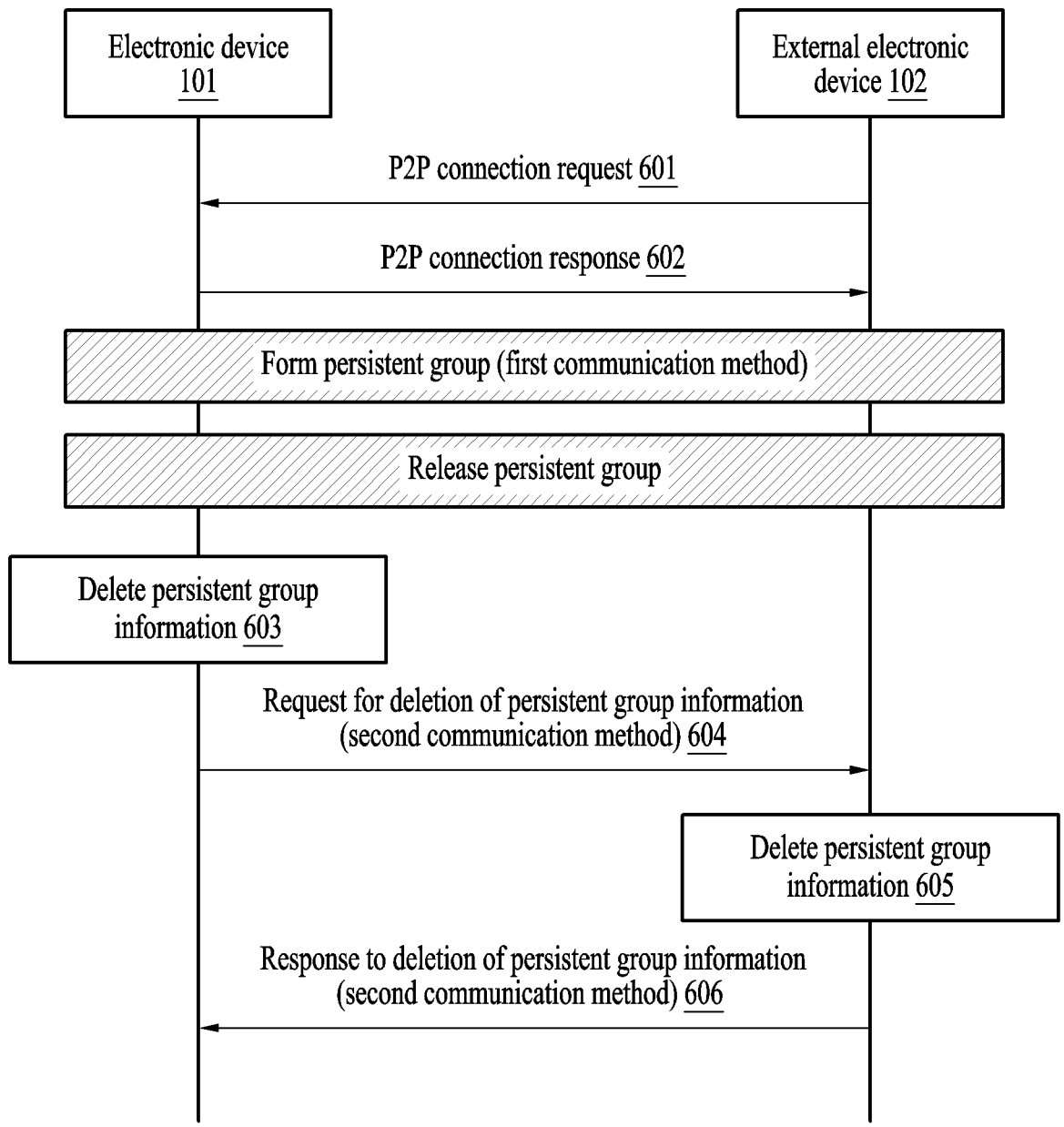
FIG. 6 is a flowchart illustrating a process of deleting persistent group information during release of a persistent group according to an embodiment of the disclosure.

FIG. 6 is a flowchart illustrating a process of deleting persistent group information during release of a persistent group according to an embodiment of the disclosure.

FIG. 6 may illustrate a case in which persistent group information is deleted from the electronic device 101 among the electronic device 101 (e.g., the electronic device 101 of FIG. 1 or FIG. 2) and an external electronic device (e.g., the external electronic device 102 of FIG. 2) forming a persistent group. The operations to be described with reference to FIG. 6 may not necessarily be performed in sequential order. FIG. 6 may assume a case in which a persistent group is already formed according to an advance procedure for a P2P connection, such as operations 301 to 304 shown in FIG. 3 or operations 401 to 404 shown in FIG. 4.

In operation 601, the electronic device 101 may receive a P2P connection request from the external electronic device 102. In operation 602, the electronic device 101 may transmit a P2P connection response to the external electronic device 102 in response to the P2P connection request. Through operations 601 and 602, the P2P connection may be made between the electronic device 101 and the external electronic device 102 and a persistent group may be formed. The data transmission may be possible between the electronic device 101 and the external electronic device 102 through the first communication method (e.g., the Wi-Fi Direct connection) in the persistent group. After that, the persistent group may be released and the P2P connection such as a Wi-Fi Direct connection may be terminated.

In operation 603, the electronic device 101 may delete persistent group information according to a specific event. According to another embodiment, the persistent group information may be deleted by a user of the electronic device 101 or deleted according to any one event of initialization of network information, initialization of the entire electronic device 101, or an error of the file system of the electronic device 101.

In operation 604, the electronic device 101 may transmit a request for deletion of persistent group information to the external electronic device 102 storing the persistent group information. Since a P2P connection proceeds through a persistent group and the P2P connection is terminated, the electronic device 101 may transmit the request for deletion of the persistent group information through a second communication method that is different from the P2P connection. For example, the electronic device 101 may transmit the request for deletion of the persistent group information to the external electronic device 102 using the second communication method, such as Bluetooth such as out of band (OOB), near field communication (NFC), or Bluetooth low energy (BLE), that is different from the first communication method.

In operation 605, the external electronic device 102 may delete persistent group information from the file system according to the request for deletion of the persistent group information received from the electronic device 101.

In operation 606, the electronic device 101 may receive a response to deletion of the persistent group information from the external electronic device 102. For example, since a P2P connection is made through a persistent group, the electronic device 101 may receive the response to deletion of the persistent group information through the second communication method that is different from the P2P connection.

Figure 7:
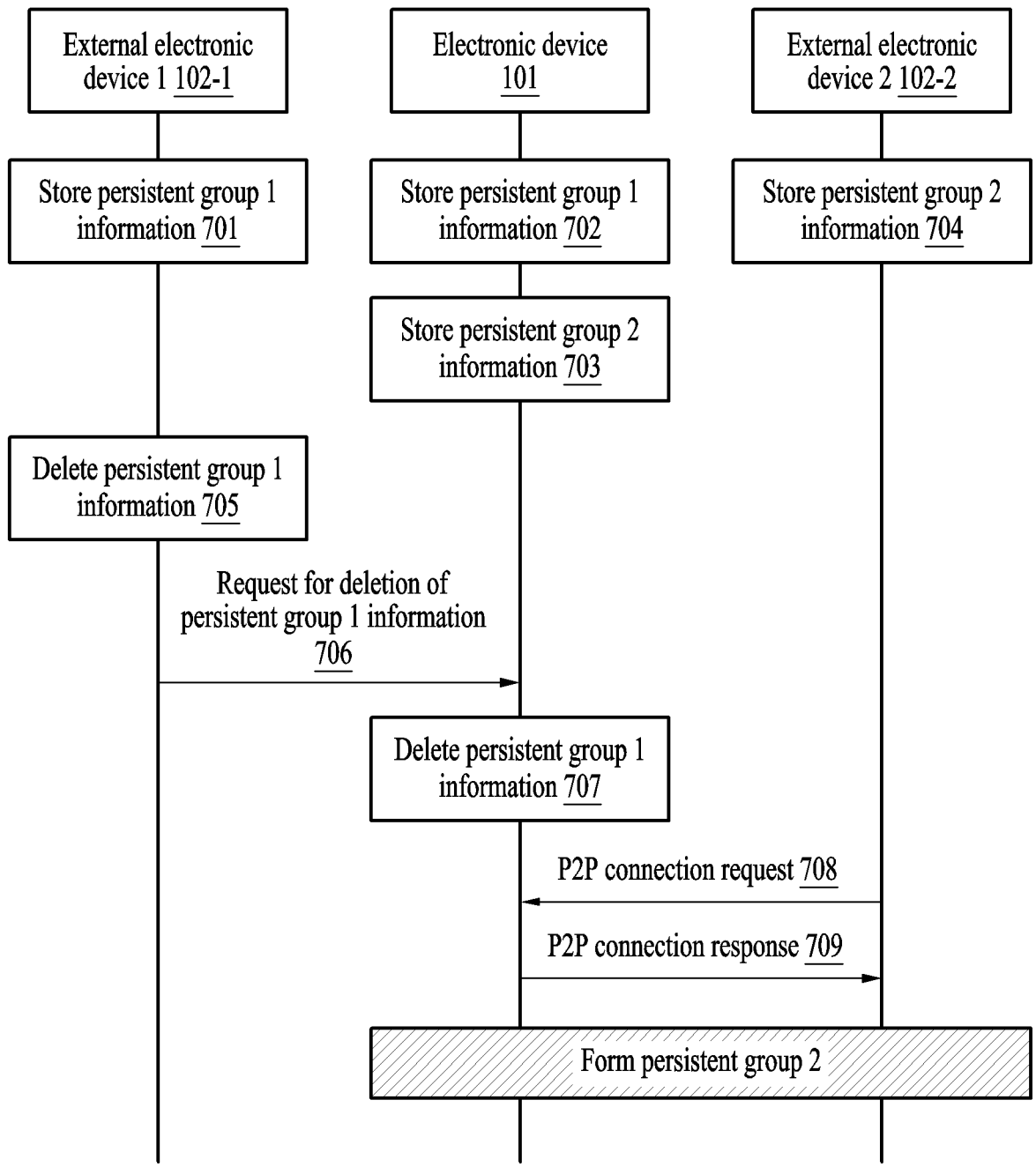
FIG. 7 is a flowchart illustrating a processing process after persistent group information is deleted according to an embodiment of the disclosure.

FIG. 7 is a flowchart illustrating a processing process after persistent group information is deleted according to an embodiment of the disclosure.

FIG. 7 may illustrate a case in which persistent group information is deleted from an external electronic device 1 102-1 among the electronic device 101 (e.g., the electronic device 101 of FIG. 1 or FIG. 2), the electronic device 1 102-1, and an external electronic device 2 102-2 (e.g., the external electronic device 102 of FIG. 2) forming a persistent group. The operations to be described with reference to FIG. 7 may not necessarily be performed in sequential order.

Referring to FIG. 7, the electronic device 101 and the external electronic device 102-1 may form a persistent group 1 for a P2P connection and the electronic device 101 and the external electronic device 102-2 may form a persistent group 2 for a P2P connection.

As shown in FIG. 7, in operation 701, the external electronic device 1 102-1 may store persistent group 1 information. In operation 702, the electronic device 101 may store the persistent group 1 information, and in operation 703, the electronic device 101 may store persistent group 2 information. In operation 704, the external electronic device 2 102-2 may store persistent group 2 information.

In operation 705, the persistent group 1 information may be deleted from the external electronic device 1 102-1 according to a specific event. In operation 706, the electronic device 101 may receive a request for deletion of the persistent group 1 information from the external electronic device 1 102-1. Since the external electronic device 1 102-1 and the external electronic device 2 102-2 are not group members of the persistent group 1, transmitting the request for deletion of the persistent group 1 information to the external electronic device 2 102-2 may not be required to the external electronic device 1 102-1. In operation 707, the electronic device 101 may delete the persistent group 1 information.

The electronic device 101 and the external electronic device 2 102-2 still operate as a group member of the persistent group 2. In operation 708, the electronic device 101 may receive a P2P connection request from the external electronic device 2 102-2. The electronic device 101 may directly perform a P2P connection without going through an advance procedure for the P2P connection using the persistent group 2 information according to the P2P connection request of the external electronic device 2 102-2. In operation 709, the electronic device 101 may transmit a P2P connection response to the external electronic device 2 102-2. The electronic device 101 and the external electronic device 2 102-2 may form the persistent group 2 through the P2P connection.

After operation 707, when the external electronic device 1 102-1 transmits a P2P connection request to the electronic device 101, a P2P connection may be possible only when all the advance procedures for the P2P connection are performed such as operations 301 to 304 of FIG. 3 or operations 401 to 404 of FIG. 4.

Figure 8:
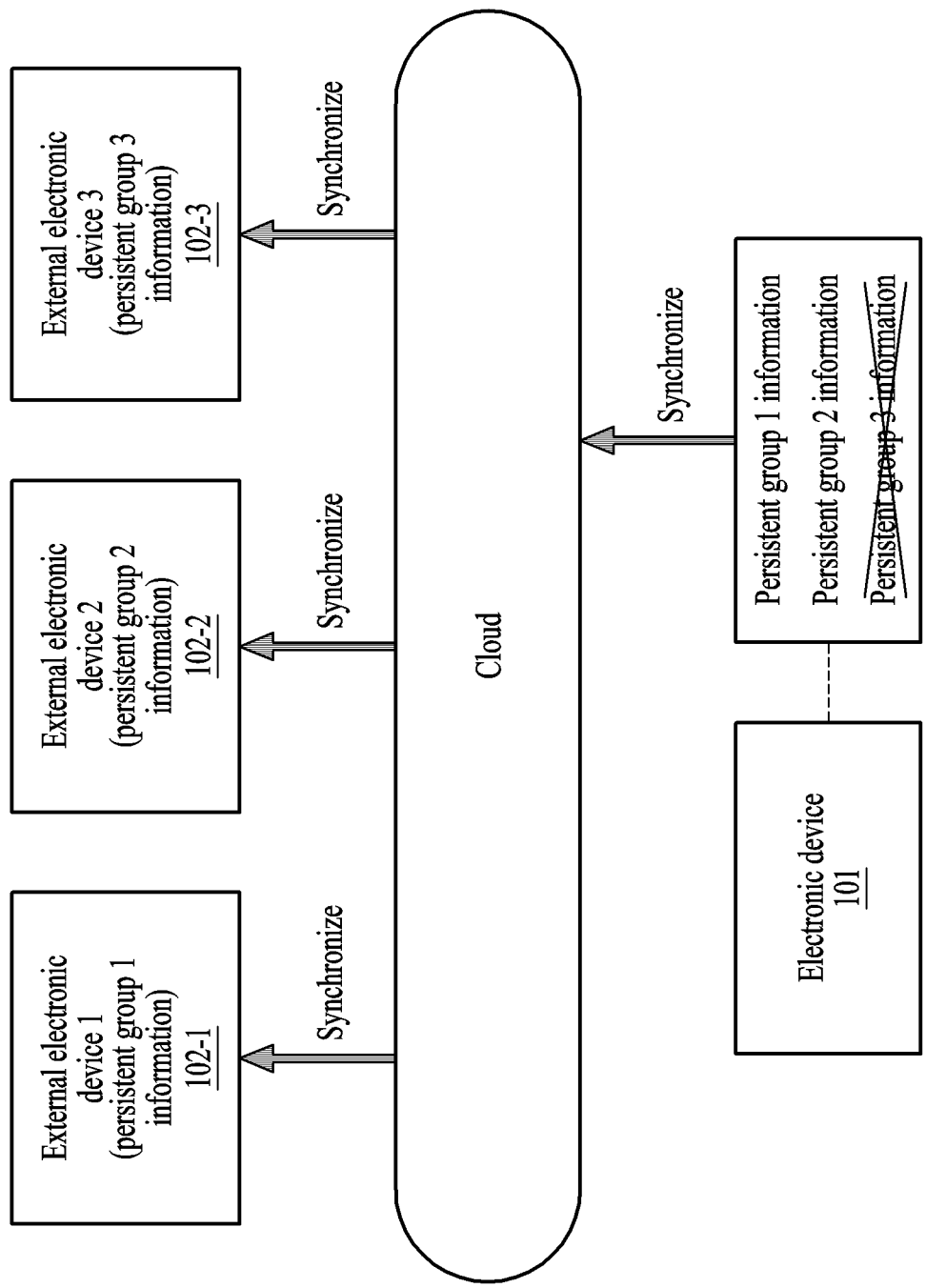
FIG. 8 is a diagram illustrating a process of managing persistent group information through a cloud according to an embodiment of the disclosure.

FIG. 8 is a diagram illustrating a process of managing persistent group information through a cloud according to an embodiment of the disclosure.

FIG. 8 may consider that the persistent group 1 is formed between the electronic device 101 (e.g., electronic device 101 of FIG. 1 or FIG. 2) and the external electronic device 1 102-1 (e.g., the external electronic device 102 of FIG. 2). FIG. 8 may consider that the persistent group 2 is formed between the electronic device 101 and the external electronic device 2 102-2 (e.g., the external electronic device 102 of FIG. 2). FIG. 8 may consider that a persistent group 3 is formed between the electronic device 101 and an external electronic device 3 102-3 (e.g., the external electronic device 102 of FIG. 2).

FIGS. 3 to 7 may illustrate a process in which a request for deletion of persistent group information is transmitted between performing subjects when the persistent group information is deleted. FIG. 8 may illustrate a process in which the persistent group information is automatically deleted by being synchronized through a cloud when the persistent group information is shared through the cloud and the persistent group information is deleted from one of the performing subjects who share the persistent group information.

According to an embodiment, the electronic device 101 may store the persistent group 1 information for the persistent group 1 formed with the external electronic device 1 102-1, the persistent group 2 information for the persistent group 2 formed with the external electronic device 2 102-2, and the persistent group 3 information for the persistent group 3 formed with the external electronic device 3 102-3.

When the persistent group 3 information is deleted from the electronic device 101 according to a specific event, the persistent group 3 information may also be deleted from the external electronic device 3 102-3 storing the persistent group 3 information by being synchronized through a cloud.

The examples described herein may be implemented using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing device may also access, store, manipulate, process, and create data in response to execution of the software. For example, the processing device may include a plurality of processors, or a single processor and a single controller. In addition, different processing configurations are possible, such as parallel processors.

The software may include a computer program, a piece of code, an instruction, or one or more combinations thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored in a non-transitory computer-readable recording medium.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as compact disc (CD)-read-only memory (ROM) discs and digital versatile discs (DVDs); magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

The above-described hardware devices may be configured to act as one or more software modules in order to perform the operations of the above-described examples, or vice versa.

Although the examples have been described with reference to the limited drawings, one of ordinary skill in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device for managing persistent group information of the electronic device, the method comprising:

receiving, by the electronic device, a peer-to-peer (P2P) connection provision request from an external electronic device;

transmitting, by the electronic device, a P2P connection provision response in response to the P2P connection provision request to the external electronic device;

forming, by the electronic device, a persistent group based on the P2P connection provision response;

transmitting, by the electronic device, a group owner negotiation request to the external electronic device;

receiving, by the electronic device, a group owner negotiation response from the external electronic device;

storing, by the electronic device, persistent group information of the persistent group;

transmitting, by the electronic device, a request for deletion of the persistent group information to the external electronic device when the persistent group information is deleted according to an event;

receiving, by the electronic device from the external electronic device, a response to deletion of the persistent group information, when the persistent group information is deleted from the external electronic device; and transmitting, by the electronic device to another electronic device, information that a previously-persistent group to which the electronic device belongs is no longer a persistent group after the persistent group information is deleted, wherein the event comprises one of deletion of the persistent group information by a user of the electronic device, initialization of network information, initialization of the electronic device, or an error in a file system of the electronic device.

2. The method of claim 1, wherein the request for deletion of the persistent group information is transmitted through a same communication method as that of a P2P connection forming the persistent group when the persistent group is maintained.

3. The method of claim 1, wherein the request for deletion of the persistent group information is transmitted through a communication method that is different from a P2P connection forming the persistent group when the persistent group is released.

4. The method of claim 1, wherein the external electronic device is configured to perform a P2P connection through provision discovery, a group owner negotiation process, and provisioning, when performing a P2P connection with the electronic device after the persistent group information is deleted.

5. The method of claim 1, wherein the persistent group information comprises an authentication type, an encryption type, a network key, and a service set identifier (SSID), which are credential information, and a group role meaning a group owner or a group client.

6. A method performed by an electronic device for managing persistent group information, the method comprising:
receiving, by the electronic device, a peer-to-peer (P2P) connection provision request from an external electronic device;
transmitting, by the electronic device, a P2P connection provision response in response to the P2P connection provision request to the external electronic device;
forming, by the electronic device, a persistent group based on the P2P connection provision response;
transmitting, by the electronic device, a group owner negotiation request to the external electronic device;
receiving, by the electronic device, a group owner negotiation response from the external electronic device;
storing, by the electronic device, persistent group information of the persistent group;
receiving, by the electronic device from the external electronic device, a request for deletion of the persistent group information when the persistent group information is deleted from the external electronic device according to an event;
deleting, by the electronic device, the persistent group information according to the request for deletion;
transmitting, by the electronic device, a response to deletion of the persistent group information to the external electronic device when the persistent group information is deleted;
transmitting, by the electronic device to another electronic device, information that a previously-persistent group to which the electronic device belongs is no longer a persistent group after the persistent group information is deleted,
wherein the event comprises one of deletion of the persistent group information by a user of the electronic device, initialization of network information, initialization of the electronic device, or an error in a file system of the electronic device.

7. The method of claim 6, wherein the request for deletion of the persistent group information is transmitted through a same communication method as that of a P2P connection forming the persistent group when the persistent group is maintained.

8. The method of claim 6, wherein the request for deletion of the persistent group information is transmitted through a communication method that is different from a P2P connection forming the persistent group when the persistent group is released.

9. The method of claim 6, wherein the external electronic device is configured to perform a P2P connection through provision discovery, a group owner negotiation process, and provisioning, when performing a P2P connection with the electronic device after the persistent group information is deleted.

10. The method of claim 6, wherein the persistent group information comprises an authentication type, an encryption type, a network key, and an SSID, which are credential information, and a group role meaning a group owner or a group client.

11. An electronic device comprising:
memory configured to store instructions; and
at least one processor configured to execute the instructions,
wherein, the instructions, when executed by the at least one processor, cause the electronic device to:
receive a peer-to-peer (P2P) connection provision request from an external electronic device,
transmit a P2P connection provision response in response to the P2P connection provision request to the external electronic device,
form a persistent group based on the P2P connection provision response,
transmit a group owner negotiation request to the external electronic device,
receive a group owner negotiation response from the external electronic device,
store persistent group information of the persistent group,
transmit a request for deletion of the persistent group information to the external electronic device when the persistent group information is deleted according to an event,
receive from the external electronic device, a response to deletion of the persistent group information, when the persistent group information is deleted from the external electronic device, and
transmit to another electronic device, information that a previously-persistent group to which the electronic device belongs is no longer a persistent group after the persistent group information is deleted,
wherein the event comprises one of deletion of the persistent group information by a user of the electronic device, initialization of network information, initialization of the electronic device, or an error in a file system of the electronic device.

12. The electronic device of claim 11, wherein the request for deletion of the persistent group information is transmitted through a same communication method as that of a P2P connection forming the persistent group when the persistent group is maintained.

13. The electronic device of claim 11, wherein the request for deletion of the persistent group information is transmitted through a communication method that is different from a P2P connection forming the persistent group when the persistent group is released.

14. The electronic device of claim 11, wherein the external electronic device is configured to perform a P2P connection through provision discovery, a group owner negotiation process, and provisioning, when performing a P2P connection with the electronic device after the persistent group information is deleted.

15. The electronic device of claim 11, wherein the persistent group information comprises an authentication type, an encryption type, a network key, and a service set identifier (SSID), which are credential information, and a group role meaning a group owner or a group client.

* * * * *